(12) United States Patent
Kingsford et al.

(10) Patent No.: US 6,692,036 B2
(45) Date of Patent: Feb. 17, 2004

(54) UNIVERSAL INTERLOCKING FITTING

(75) Inventors: Kenji A. Kingsford, Devore, CA (US);
Peter N. Nguyen, Garden Grove, CA (US)

(73) Assignee: Saint-Gobain Performance Plastics, Wayne, NJ (US)

( * ) Notice: Subject to any disclaimer, the term of this patent is extended or adjusted under 35 U.S.C. 154(b) by 0 days.

(21) Appl. No.: 09/919,625

(22) Filed: Jul. 30, 2001

(65) Prior Publication Data
US 2002/0070544 A1 Jun. 13, 2002

Related U.S. Application Data
(60) Provisional application No. 60/223,210, filed on Aug. 4, 2000.

(51) Int. Cl.[7] ............................................. F16L 55/00
(52) U.S. Cl. .......................... 285/92; 285/912; 285/331; 285/81
(58) Field of Search ......................... 285/81, 912, 92, 285/333, 334, 331, 401, 82; 411/115, 128; F16L 04/10

(56) References Cited

U.S. PATENT DOCUMENTS

| | | | | |
|---|---|---|---|---|
| 532,169 A | * | 1/1895 | Smith | 411/128 |
| 594,861 A | * | 12/1897 | Derick | 411/128 |
| 759,232 A | * | 5/1904 | Bloomqvist | 411/128 |
| 1,051,770 A | * | 1/1913 | Slattery | 411/128 |
| 1,691,851 A | * | 11/1928 | McCuean | 285/332.1 |
| 2,544,108 A | * | 3/1951 | Richardson | 285/116 |
| 3,624,812 A | | 11/1971 | Rosan et al. | |
| 4,152,039 A | | 5/1979 | Shah | |
| 4,169,967 A | | 10/1979 | Bachle | |
| 4,484,769 A | * | 11/1984 | Lacey | 285/110 |
| 4,611,838 A | * | 9/1986 | Heilmann et al. | 285/331 |
| 4,655,482 A | | 4/1987 | Myers et al. | |
| 4,749,217 A | | 6/1988 | Causby et al. | |
| 4,785,858 A | * | 11/1988 | Valentini et al. | 141/27 |
| 5,200,575 A | | 4/1993 | Sheehan | |
| 5,215,336 A | | 6/1993 | Worthing | |
| 5,269,566 A | | 12/1993 | Do et al. | |
| 5,348,349 A | | 9/1994 | Sloane | |
| 5,362,110 A | | 11/1994 | Bynum | |
| 5,586,790 A | | 12/1996 | Bynum | |
| 5,882,044 A | | 3/1999 | Sloane | |
| 5,931,508 A | | 8/1999 | Spriegel | |
| 5,997,049 A | * | 12/1999 | Kingsford et al. | 285/331 |

FOREIGN PATENT DOCUMENTS

GB         479152    *   2/1938  ................. 285/401

* cited by examiner

Primary Examiner—Lynne H. Browne
Assistant Examiner—Aaron Dunwoody
(74) Attorney, Agent, or Firm—Jeffer, Mangela, Butler & Marmaro, LLP

(57) ABSTRACT

Fittings of this invention comprise a body having a substantially hollow transport passage extending between a body first end and a body second end. The fitting body ends are adapted to accommodate attachment with respective fluid handling devices. The fitting has a hexagonal outside surface portion for grasping and rotating the fitting. An interlocking attachment member is disposed along an outside surface of the fitting body and is adapted to form an interlocking attachment with a complementary member of a fluid handling device when the fitting is connected thereto. The interlocking attachment member comprises a plurality of ratchet teeth that are configured to register with a complementary fluid handling device member. The fitting body first end includes a tongue that is configured to provide an interference fit within a groove in a fluid handling device opening to provide a leak-tight seal between the fitting the fluid handling device.

22 Claims, 4 Drawing Sheets

UNIVERSAL INTERLOCKING FITTING

CROSS-REFERENCE TO RELATED APPLICATIONS

This application claims the benefit of U.S. Provisional Application No. 60/223,210, filed Aug. 4, 2000.

FIELD OF THE INVENTION

This invention related to a fitting useful for connecting two different assemblies together to enable fluid or gas transport therebetween and, more specifically, to a fitting designed to form an interlocking attachment with one of the different assemblies to prevent intentional detachment of the fitting when the other one of the different assemblies is removed therefrom.

BACKGROUND OF THE INVENTION

Fittings used for connecting different assemblies together and for providing fluid or gas flow communication therebetween are well known in the art. For example, fittings having differently configured attachment end are commonly used to connect together fluid handling devices having differently configured or differently sized fluid transport attachments. Such fluid attachments are configured having a variety of different shapes such as tees, differently angled elbows, and the like.

Fittings used in fluid handling processing for the manufacturer of semiconductors, for example, are desirably formed from a nonmetallic material, as is all of the wetted members of associated fluid handling equipment. Forming such wetted fluid handling members and fittings from a nonmetallic material is desired to minimize or eliminate the potential for introducing for process fluid contamination into the system. The use of aggressively active chemicals in the semiconductor manufacturing process caustic have a known corrosive effect on metal surfaces, thereby otherwise producing a known source of process contamination.

Thus, fittings and fluid handling devices used in such fluid handling operations are preferably formed, or have wetted members that are formed, from a nonmetallic material, i.e., a chemical resistant polymer. In many instances, a fitting used in such application is interconnected between two fluid handling devices that are formed from nonmetallic materials. In such example application, the fitting can be threadably connected to a first fluid handling device at one of the fitting ends and can be threadably connected to a second fluid handling device at another of the fitting ends.

A problem that is known to occur in such a fitting application is that the threaded attachment between the fitting and the first fluid handling device can become unintentionally loosened when the second fluid handling device is loosened or removed from the fitting. The reasons that this occurs is due to the use of nonmetallic materials and the associated low coefficient of friction that exists between the nonmetallic materials of the fitting and both of the fluid handling devices. The low coefficient of friction between the fitting and interconnected first and/or second fluid handling devices is also known to cause the threaded connection with either device to become loosened during the normal process of fluid transportation between the devices, e.g., possibly caused by thermal cycling and/or process element vibration and the like.

Fittings used in the above-described application are, therefore, known to become intentionally loosened during the fluid transport process and during fluid device removal. If left unchecked, the loosened fittings can produce an environmental or a personal safety hazard if loosened to the extent that process fluid is allowed to escape to the environment.

It is, therefore, desired that a fitting be configured that would reduce or eliminate the possibility that it could be unintentionally loosened during normal fluid transport operation, or device removal. It is also desirable that such fitting be capable of providing an interconnection between fluid handling devices having differently sized fitting connections. It is further desired that such fitting connection be relatively easy to use without the need for specialty tools.

SUMMARY OF THE INVENTION

Fittings of this invention provide both a leak-tight seal and a interlocking attachment, when connected to a fluid handling device, to prevent unintentional fitting loosening that could result in leakage to the surrounding environment. Fittings of this invention generally comprise a body having a substantially hollow transport passage that extends between a body first end and a body second end. Each of the fitting body ends are adapted to accommodate attachment with respective fluid handling devices. In an example embodiment, the fitting body ends are configured to accommodate attachment with a threaded members of such fluid handling devices.

The fitting includes a means for grasping the fitting disposed along an outside surface of the body. The grasping means provides a holding point on the fitting body that is used to rotate the fitting relative to a fluid handling device, e.g., for providing a threaded engagement therewith. An interlocking attachment member is disposed along an outside surface of the fitting body and is adapted to form an interlocking attachment with a complementary member of a fluid handling device when the fitting is connected thereto. In an example embodiment, the interlocking attachment member comprises a plurality of rachet teeth that are configured to register with a complementary fluid handling device member.

The fitting body first end includes a tongue that projects axially a distance therefrom that is sized and shaped to provide an interference fit within a groove disposed within a fluid handling device opening. The tongue-in-groove attachment provides a leak-tight seal between the fitting the fluid handling device.

Fittings of this invention provide both a releasible interlocking connection with a fluid handling device that will not become unintentionally loosened from fluid transport operation of loosenin of a connection at the fitting body second end, and a leak-tight seal between the fitting and the fluid handling device. Further, fittings of this invention can be configured having differently sized first and second end, thereby enabling the fitting to be used to provide a transport coupling between differently sized attachments of fluid transport devices.

DESCRIPTION OF THE DRAWINGS

These and other features, aspects, and advantages of the present invention will be more fully understood when considered with respect to the following detailed description, appended claims, and accompanying figures:

DETAILED DESCRIPTION

Fittings, constructed according to principles of this invention, comprise a fitting body having a hollow fluid transport passage that extends through the body between opposite body ends. The fitting body includes an interlocking attachment member disposed along an outside body surface that is interposed between the ends. The interlocking member is configured to interact with a complementary interlocking member of a fitting device when the fitting is connected thereto. The fitting further comprises a tongue positioned along one of the body ends that is sized and configured to cooperate with a complementary groove in the fitting device to provide a leak-tight fitting therewith. The fitting body ends can be configured to accommodate attachment between differently sized connection elements, e.g., connection elements of different fluid handling devices. Fittings of this invention minimize or eliminate the potential for the fitting becoming loosened from its connection with the interlocking fitting device.

Figure 1:
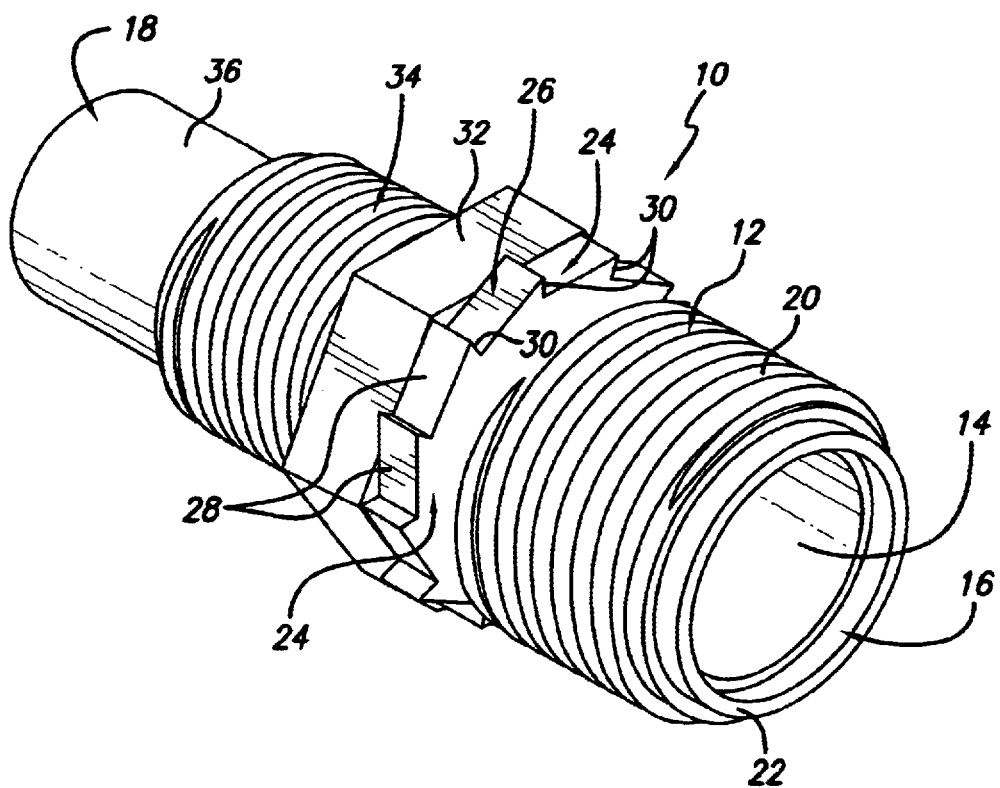
FIG. 1 is a perspective side view of a fitting of this invention.

FIG. 1 illustrates a fitting 10 of this invention comprising a body 12 having a hollow fluid or gas transport passage 14 extending therethrough from a first body end 16 to a second body end 18. In an example embodiment, the body has a substantially cylindrical shape and the ends 16 and 18 are positioned at opposite axial ends of the body. The body can be formed from any type of structurally rigid material. However, for use with fluid handling processing of semiconductors, it is preferred that the body be formed from a nonmetallic material, e.g., a chemically-resistant plastic or polymeric material. Suitable polymeric materials include compounds selected from the group of fluoropolymers including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred material is Teflon® PFA or Teflon® PTFE, which are provided by DuPont Company of Wilmington, Del. Such materials are not damaged by corrosive, acidic, or caustic liquids and do not introduce contamination into chemically pure liquids that are used, for example, for the process of semiconductor manufacturing.

The fitting can be formed by either mold or machine process, depending on both the type of material that is chosen and the project budget. For example, in a preferred embodiment the fitting is formed from Teflon® PTFE by a molding process.

Figure 2:
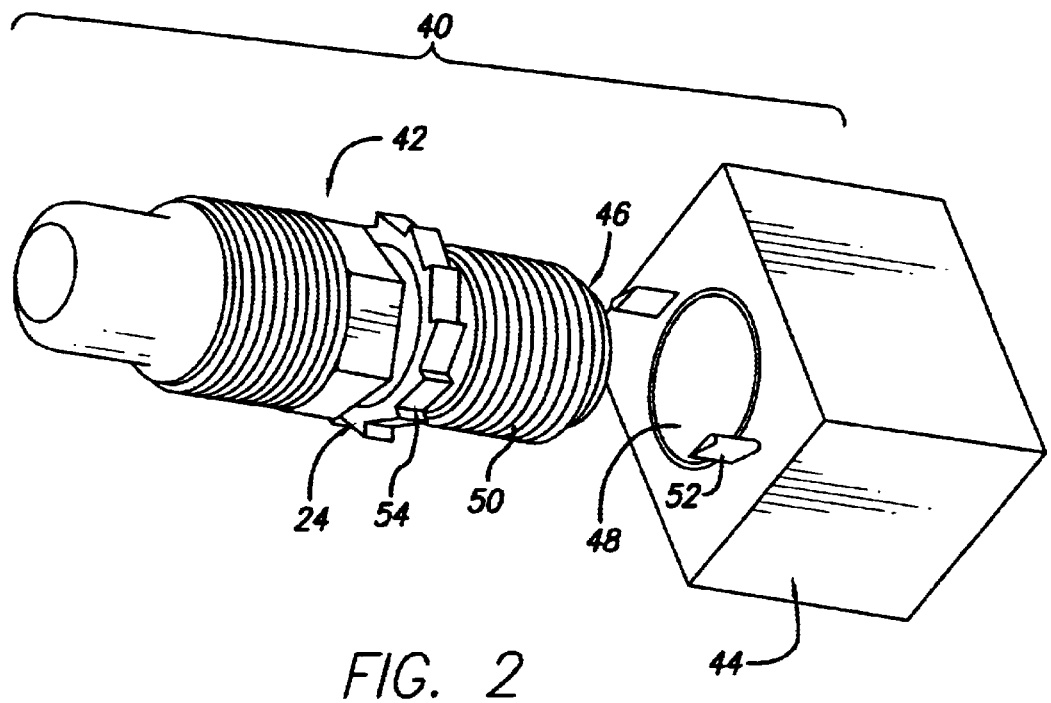
FIG. 2 is a perspective exploded side view of the fitting of FIG. 1 with a fluid handling device having a first interlocking mechanism.
Figure 3:
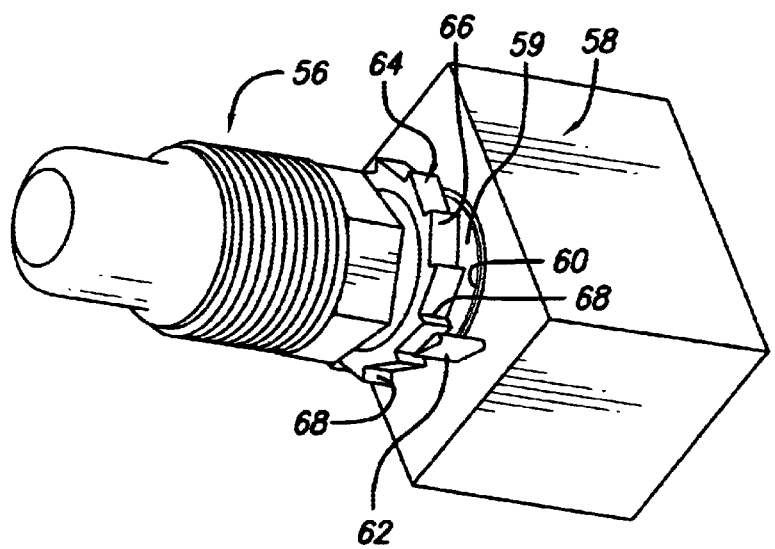
FIG. 3 is a perspective side view of an attachment assembly comprising the fitting of FIGS. 1 and 2 as attached to the fluid handling device of FIG. 2.
Figure 4:
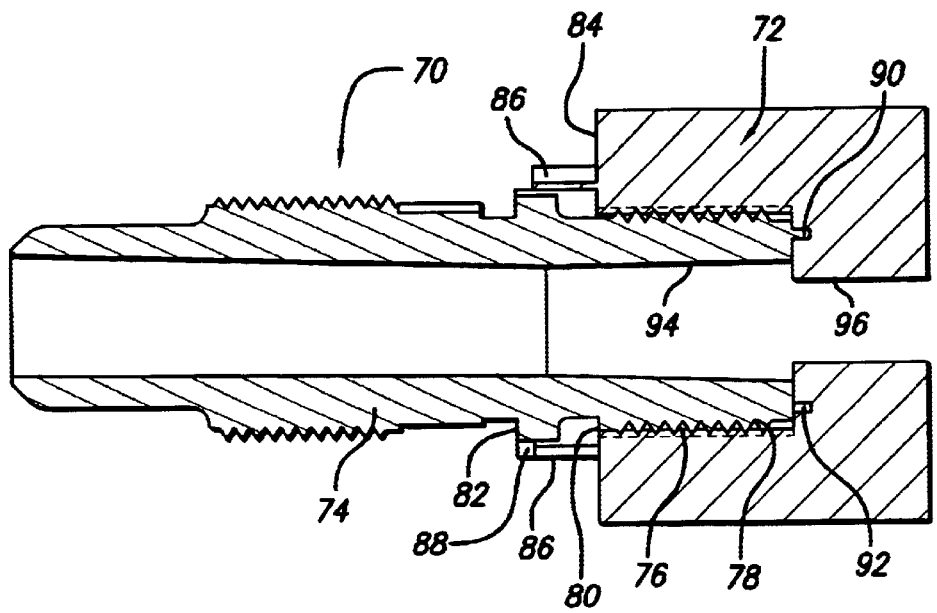
FIG. 4 is a cross-sectional side view of the attachment assembly of FIG. 3.

The fitting body 12 first end 16 is configured for connection with another fitting device, such as tubing, piping, a fluid handling device (see FIGS. 2 to 4) or the like. In an example embodiment, the first end 16 has an outside surface 20 that is threaded to accommodate threaded attachment with a complementarily threaded mating surface of another fitting device. The first end 16 also includes a tongue 22 that projects outwardly away therefrom and that defines a circumferential edge of the first end. The tongue is sized having a thickness and depth to mate with a groove within a mating opening in a fluid handling device (as described better below and as illustrated in FIGS. 2 to 4).

Moving axially away from the first end outside surface 20, the fitting body 12 includes an interlocking attachment member 24 disposed circumferentially around the body. The interlocking attachment member 24 is configured having an interlocking means that is designed to cooperate with a complementary interlocking means on a fluid handling device to provide a releasible locking attachment between the fitting and the fluid handling device when the fitting is connected thereto, e.g., is threadably connected thereto. In an example embodiment, the interlocking attachment member 24 is configured as a collar that extends a distance radially away from the body. The collar includes interlocking means in the form of a plurality of rachet teeth 26 that are positioned along an outside collar diameter. The rachet teeth 26 are canted in one radial direction to provide a repeating arrangement of sloped outwardly directed planar steps 28 that are separated by radially inwardly directed risers 30. If desired, the risers 30 can be configured to depend from respective steps at a 90 degree angle, or at a greater than 90 degree angle, i.e., the risers can be undercut. As better described below, the rachet teeth 26 are configured to provide an interlocking attachment with a complementary member of the fluid handling device.

Moving axially away from the interlocking attachment member 24, the body 12 further includes a grasping surface 32 to facilitate grasping and rotating the fitting along a central axis extending through the passage 14. In an example embodiment, the grasping surface 32 is configured having a hexagonal shape for accommodating attachment and rotation with a conventional wrench.

Moving axially way from the grasping surface 32, the fitting body 12 includes an outside surface 34 adjacent the second body end 18 that is generally configured to accommodate attachment with a fluid handling device. In an example embodiment, the outside surface 34 is threaded to accommodate threaded attachment with a complementary attachment member of a fluid handling device. It is to be understood that the outside surfaces of the fitting body adjacent the body first and second ends are configured in a manner exemplary of but one type of attachment mechanism, and that such outside surface can be configured other than as described and illustrated to permit interconnection of the fitting body between two fluid handling devices.

The body second end 18 is configured to form a leak-tight attachment with a fluid handling device. In an example embodiment, the body second end 18 is configured having a smooth outside surface 36 extending axially away from the threaded surface 34 to an axial end. The smooth surface 36 and axial end are each configured to accommodate attachment with a tube end (not shown) thereover. The tube end is positioned over the body second end 18 and is interposed between the second end smooth surface 36 and axial end, concentrically along an inside diameter, and a nut (not shown) concentrically along an outside diameter. The nut is threadably engaged with the second end threaded surface 34 to urge the tube inside diameter against the axial end to form a leak-tight seal therewith.

FIG. 2 illustrates a fitting assembly 40 comprising the fitting 42 of FIG. 1 as used to provide a fluid or gas transport coupling with a fluid transport device 44. The fitting 42 is positioned with its body first end 46 oriented towards an attachment port 48 of the fluid handling device. The attachment port 48 is configured having a threaded wall surface that complements the threaded outside surface 50 of the body first end.

The fluid transport device 44 further includes one or more interlocking attachment members 52 that is positioned adjacent the attachment port 48. In an example embodiment, the interlocking attachment members 52 are in the form of one or more projections that are integral with and that extend outwardly away from the fluid handling device. In a preferred embodiment, the fluid handling device comprises a pair of projections 52 that are positioned diametrically opposed from one another and that are configured to cooperate with the rachet teeth 54 disposed along the fitting collar 24 to provide a one-way interlocking cooperation therewith.

The fluid handling device can be in the form of a distribution manifold, a valve, a pump, or the like comprising a wetted surface, i.e., an attachment opening, constructed from the same general type of material used to form the fitting. For use in the process of semiconductor manufacturing, the fluid handling device has a wetted attachment opening formed from the same types of fluoropolymeric materials described above.

FIG. 3 illustrates an attachment assembly comprising the fitting 56 as attached with the fluid handling device 58, with the fitting first end 59 engaged within the fluid handling device attachment opening 60. The fitting 56 is connected with the fluid handling device by inserting the body first end into the fluid handling device opening 60, engaging the respective body and opening threaded surfaces, and rotating one of the fitting and fluid handling device relative to one another. As the fitting first end is threaded into device opening, the projections 62 begin to engage the body rachet teeth 64. As the fitting is drawn into the device opening, the projections 62 continue to engage a greater and greater portion of the rachet teeth surface. The projections 62 are specifically configured to engage the rachet teeth and to flex a controlled amount to permit passage of the projection over the ramped rachet teeth. As each rachet tooth step surface 66 passes across a projection, the projection engages the rachet tooth riser 68 to prevent rotation of the fitting vis-a-vis the device in an opposite direction. Thereby, providing a one-way interlocking attachment between the fitting 56 and the device 58. The one-way interlocking attachment described above can be released by manually urging the projections 62 radially outwardly away from the fitting.

Configured in this manner, the fitting 56 can be joined, at one of its ends, to a fluid handling device 58, and form an interlocking connection therewith that is not susceptible to becoming unintentionally loosened during fluid transport operation. Further, the interlocking connection formed by the fitting and the fluid handling device will not become loosened by the act of removing or losening a threaded connection at the fitting second end with another fluid device.

FIG. 4 illustrates, in cross-section, the attachment assembly interconnection that is formed between the fitting 70 and fluid handling device 72. As described above, the fitting body 74 first end threaded outside surface 76 is threadably engaged with the complementary threaded wall surface 78 of the device attachment opening 80. The fitting body is configured such that the collar 82 extending radially away from the body, comprising the rachet teeth, is positioned a sufficient distance away from the threaded outside surface 76 such that a desired gap exist between the collar and an adjacent surface 84 of the device proximate the attachment opening 80. This gap is provided so that the projections 86 are able to be flexibly moved radially outwardly from the device, to permit cooperation with the body rachet teeth 88, without imposing undue stress along the base of the projections.

Additionally, the fitting first end is configured having a desired axial length such that the tongue 90 projecting axially from the body first end is completely engaged within a groove 92 disposed within a base of the device attachment opening, and that such engagement defines the amount by which the fitting can be inserted into the device. In a preferred embodiment, the tongue 90 is sized having a wall thickness that is slightly larger than that of the groove 92 to form an interference fit therebetween upon engagement of the tongue within the groove. This tongue-in-groove engagement provides a leak-tight seal between the fitting the device opening, thereby preventing the passage of fluid from either the fitting fluid transport passage 94 or the device fluid transport passage 96, to the threaded surfaces of the fitting and the device opening. Thus, helping to reduce or eliminate the potential for fluid leakage into the surrounding environment from the coupled assembly.

A fitting and fluid handling device comprising a specific interlocking member construction has been described above and illustrated in FIGS. 1 to 4. As mentioned above, it is to be understood that this fitting embodiment is representative of but one type of interlocking member construction, and that other types of interlocking member constructions are intended to be within the scope of this invention.

Figure 5:
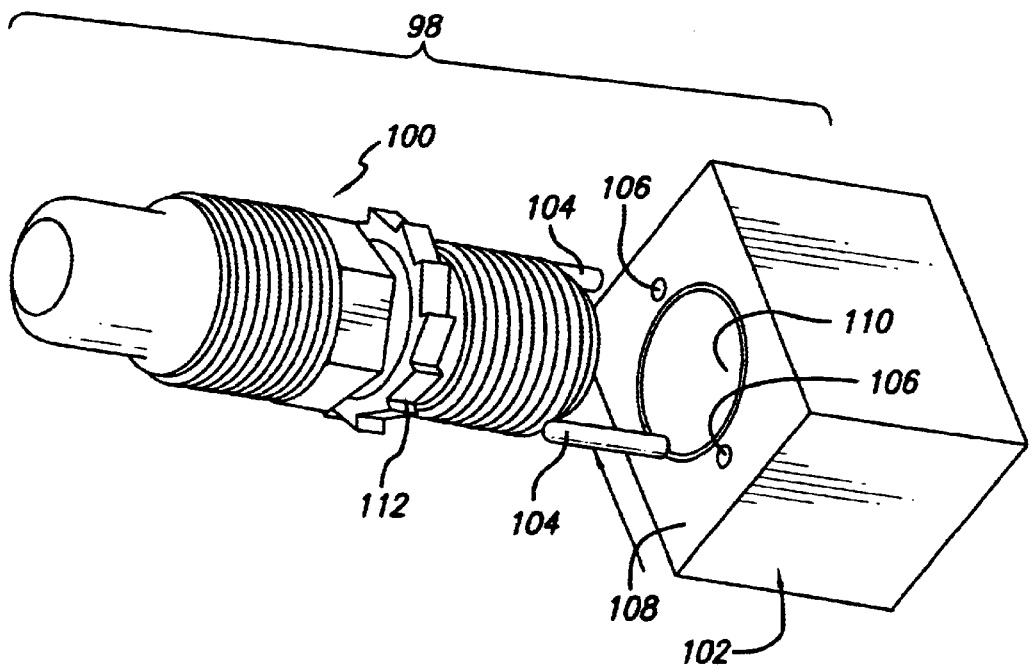
FIG. 5 is a perspective exploded side view of the fitting of FIG. 1 with a fluid handling device having a second interlocking mechanism.

FIG. 5 illustrates another embodiment fitting assembly 98 comprising a fitting 100 of this invention as connected with a fluid handling device 102. Unlike the fitting assembly described above and illustrated in FIGS. 2 to 4, this fitting assembly makes use of a fluid handling device comprising nonintegral interlocking attachment members. In an example embodiment, the nonintegral interlocking attachment members are in the form of one or more pins 104 that are sized for placement within respective pin openings 106 disposed within the fluid handling device surface 108 adjacent the attachment opening. In a preferred embodiment, two pins 104 are used and the pin openings 106 are positioned diametrically opposed from one another across the attachment opening 110. The pins are sized to cooperate with the fitting rachet teeth 112.

Figure 6:
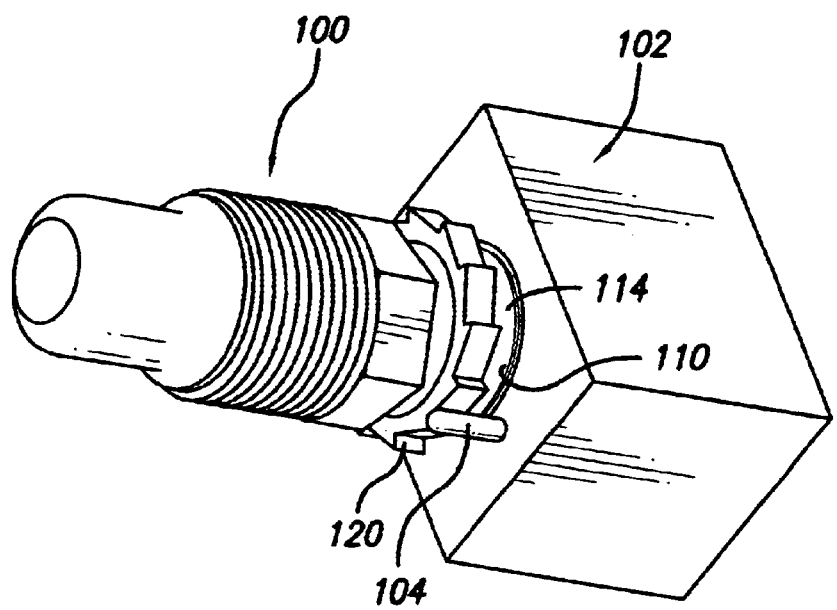
FIG. 6 is a perspective side view of an attachment assembly comprising the fitting of FIGS. 1 and 5 as attached to the fluid handling device of FIG. 5.

FIG. 6 illustrates an attachment assembly comprising the fitting 100 as attached with the fluid handling device 102, with the fitting first end 114 engaged within the fluid handling device attachment opening 110. The fitting 100 is connected with the fluid handling device, in the same manner described above for the assembly illustrated in FIG. 3, by inserting the body first end into the fluid handling device attachment opening 110, engaging the respective body and opening threaded surfaces, and rotating one of the fitting and fluid handling device relative to one another.

Figure 7:
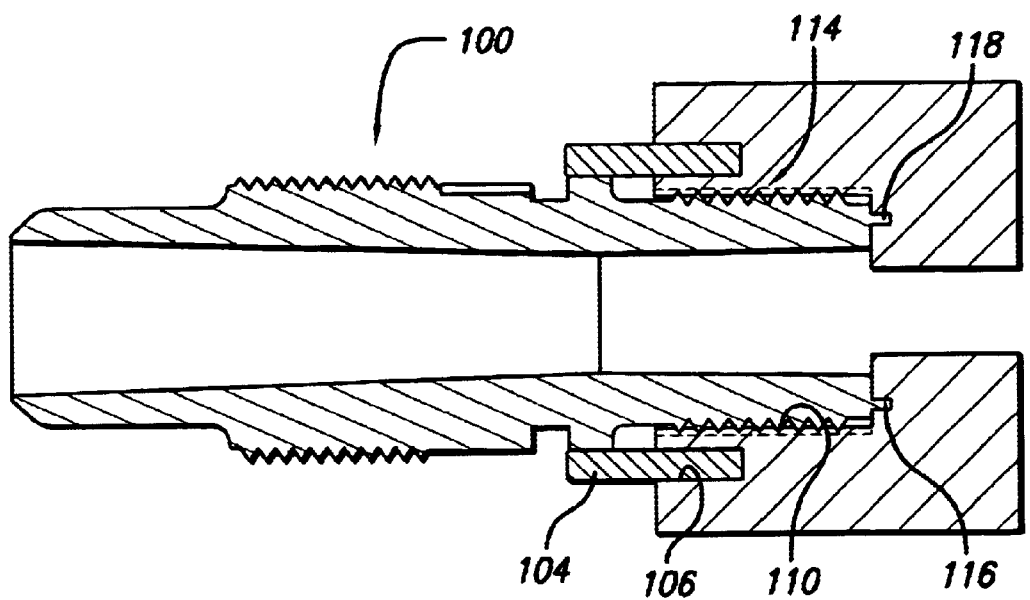
FIG. 7 is a cross-sectional side view of the attachment assembly of FIG. 6.

Referring to FIG. 7 in addition to FIG. 6, the fitting first fitting end 114 is disposed completely within the device attachment opening 110 such that the first fitting end tongue 116 is completely engaged within the groove 118. Once complete tongue-in-groove engagement is achieved, the pins 104 are positioned against respective rachet teeth risers 120 and are placed into the pin openings 106, thereby interlocking the fitting assembly with the fluid handling device so as to prevent unintentional loosening.

Fittings of this invention can be constructed to enable attachment between a single sized fluid device, at one of its ends, and multiple differently sized fluid devices at its opposite end, i.e., provide a universal fitting. Example fittings of this invention can be configured accordingly: (1) first end nominal size of ¼ in./passage size of ¼ in./ differently sized second ends of ¼ and ⅜ in.; (2) first end nominal size of ½ in./passage size of ⅜ in./differently sized second ends of ¼, ⅜, and ½ in.; (3) first end nominal size of ¾ in./passage size of ⅝ in./differently sized second ends of ½ and ¾ in.; and (4) first end nominal size of 1 in./passage size of ⅞ in./differently sized second ends of ¾ and 1 in. These are but representative examples of how fittings of this invention can be sized to provide a universal fitting function.

The ability to provide a fitting that has a universal or adapting function is important because it enables a fluid transport attachment to be formed between two differently-sized fluid handling devices in a cost effective manner, i.e., by avoiding the excess expense associated with having to provide equally-sized fluid handling devices.

Fittings of this invention, comprising an interlocking attachment member, provide a releasable interlocking attachment with a fluid handling device that minimizes or prevents the potential for the fitting to become unintentionally loosened therefrom by fluid transport operation or my the action of loosenin a fluid handling device from an opposite fitting end. Thereby, preventing the possibility of fluid or gas leakage and spillage, and associated environmental and safety hazard, that can result from a loosened fitting. Further, fittings of thin invention providing a tongue-in-groove connection with a fluid handling device also helps to minimize or eliminate the possibility of gas or fluid leakage from the transport passages of the respective fitting and device and ultimately to the surrounding environment.

Accordingly, it is to be understood that, within the scope of the appended claims, universal fittings constructed according to principles of this invention may be embodied other than as specifically described herein.

What is claimed is:

1. A fitting comprising:
   a body having a substantially hollow transport passage extending therethrough between a body first end and a body second end, the first and second ends being adapted to accommodate attachment with respective fluid handling devices;
   means for grasping the fitting disposed along an outside surface of the body;
   an interlocking attachment member disposed along an outside surface of the body integrally formed to the body that is adapted to form an interlocking attachment with a complementary member of a fluid handling device when the fitting is connected thereto; and
   means for providing a leak-tight tongue-in-groove seal between the fitting an a fluid handling device when the fitting is connected thereto integrally formed to the body at the body first end.

2. The fitting as recited in claim 1 wherein the means for grasping comprises a hexagonal body outside surface portion.

3. The fitting as recited in claim 1 wherein the interlocking attachment member comprises a collar disposed around the outside surface, the collar having a plurality of ratchet teeth disposed therealong.

4. The fitting as recited in claim 1 wherein the first end has a threaded outside surface and the means for providing a leak-tight surface comprises a cylindrical tongue that projects axially a distance from the first end.

5. The fitting as recited in claim 4 comprising a threaded outside surface adjacent the second end, wherein the second end is sized differently than that of the first end.

6. The fitting as recited in claim 1 wherein the means for grasping, the interlocking attachment member, and the means for providing a leak-tight seal are all integral with the body.

7. The fitting as recited in claim 1 wherein the body is formed from a fluoropolymeric material.

8. A fitting comprising:
   a substantially cylindrical body having a hollow transport passage extending therethrough between a body first end and a body second end, the first and second ends having a threaded outside surface adjacent thereto for accommodating attachment with respective fluid handling devices, the first end including a tongue that projects axially therefrom a desired distance to provide a leak-tight seal with an attached fluid handling device;
   means for grasping the fitting disposed along an outside surface of the body; and
   interlocking attachment means disposed along an outside surface of the body that is adapted to form a releasable interlocking attachment with a fluid handling device that is attached to the body first end;
   wherein the body is formed from a polymeric material.

9. The fitting as recited in claim 8 wherein the means for grasping and the interlocking attachment means are interposed between threaded outside surfaces adjacent the body first and second ends.

10. The fitting as recited in claim 8 wherein the means for grasping and the interlocking attachment means are integral with the body.

11. The fitting as recited in claim 8 wherein the interlocking attachment means comprises a collar that extends radially outwardly a distance from the body, the collar including a surface adapted to interact with a member of a fluid handling device attached to the first end to form a releasable interlocking attachment therewith.

12. The fitting as recited in claim 11 wherein the collar surface comprises a plurality of rachet teeth.

13. The fitting as recited in claim 8 wherein the tongue is sized having a radial wall thickness that is greater than a radial wall thickness of a groove disposed within a fluid handling device attached to the first end.

14. A fitting comprising:
   a substantially cylindrical body having a hollow transport passage extending therethrough between a body first end and a body second end, the first and second ends having a threaded outside surface adjacent thereto for accommodating attachment with respective fluid handling devices, the first end including a tongue that projects axially therefrom a desired distance to provide a leak-tight seal with an attached fluid handling device;
   a hexagonal collar disposed around an outside surface of the body and interposed between the threaded outside surfaces adjacent the first and second body ends for grasping and rotating the fitting; and
   an interlocking attachment collar disposed around the outside surface of the body and interposed between the threaded outside surfaces adjacent the first and second body ends, the interlocking collar comprising a plurality of rachet teeth disposed therealong for registering with a member of a fluid handling device attached to the body first end to form a releasable interlocking attachment therewith;
   wherein the hexagonal collar and the interlocking attachment collar are each integral with the body; and
   wherein the body is formed from a polymeric material.

15. The fitting as recited in claim 14 wherein the polymeric material is a fluoropolymer.

16. The fitting as recited in claim 14 wherein the tongue is sized having a radial wall thickness that is greater than a radial wall thickness of a groove disposed within a fluid handling device attached to the first end.

17. An attachment assembly comprising:
   a fitting comprising:
      a body having a substantially hollow transport passage extending therethrough between a body first end and a body second end, the body first end;
      means for grasping the fitting disposed along an outside surface of the body; and
      an interlocking attachment member disposed along an outside surface of the body that is adapted to form an interlocking attachment with a complementary member of a fluid handling device when the fitting is connected thereto; and
   a fluid handling device comprising:
      a body having an attachment opening disposed therein, wherein the fitting body first end is disposed within the attachment opening;
      an interlocking attachment member extending from the fluid handling device body and registering with the fitting interlocking attachment member to provide a releasible interlocking connection therebetween;
   wherein the fitting body comprises integral means for providing a tongue-in-groove attachment with the fluid handling device body.

18. The attachment assembly as recited in claim 17 wherein the fitting body and at least the fluid handing device attachment opening are each formed from a polymeric material.

19. The attachment assembly as recited in claim 17 wherein the integral means comprises a tongue that projects axially a distance the body first end, wherein the tongue is positioned within a groove that is disposed along a base of the attachment opening, wherein the tongue-in-groove attachment provides a leak-tight seal between the fitting the fluid handling device.

20. The attachment assembly as recited in claim 17 wherein the fitting interlocking attachment member comprises a plurality of ratchet teeth disposed along the body outside surface, and the fluid handling device interlocking attachment member comprises a projection that registers with the racket teeth to provide a releasible interlocking connection therebetween.

21. The attachment assembly as recited in claim 20 wherein the ratchet teeth project radially away from the body outside surface.

22. An attachment assembly comprising:
   a fitting comprising:
      a substantially cylindrical body having a hollow transport passage extending therethrough between a body first end and a body second end, the first and second ends having a threaded outside surface positioned adjacent thereto, the first end including a tongue that projects axially therefrom a desired distance;
      a collar disposed around an outside surface of the body and interposed between the threaded outside surfaces adjacent the first and second body ends for grasping and rotating the fitting; and
      an interlocking attachment collar disposed around the outside surface of the body and interposed between the threaded outside surfaces adjacent the first and second body ends, the interlocking collar comprising a plurality of rachet teeth disposed therealong, wherein the collar and the interlocking attachment collar are each integral with the body, and wherein the body is formed from a polymeric material;
   a fluid handling device comprising:
      a body having a threaded attachment opening with a groove disposed within a base portion of the opening, wherein the fitting body first end is disposed within the attachment opening and the tongue is placed into the groove to provide a leak-tight seal therebetween;
      an interlocking attachment member extending from the fluid handling device body and registering with one or more of the rachet teeth to provide a releasible interlocking connection between the fitting and the fluid handling device;
   wherein at least the attachment opening is formed from a polymeric material.

* * * * *